June 23, 1942.  L. G. TOWNSEND  2,287,072
APPARATUS FOR PLOTTING SPOT GRAPHS
Filed July 11, 1940  2 Sheets-Sheet 2
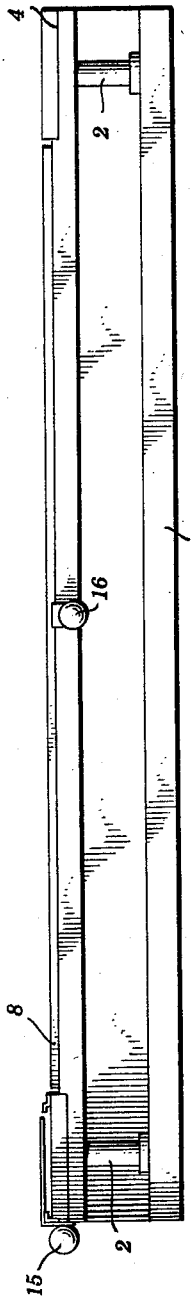
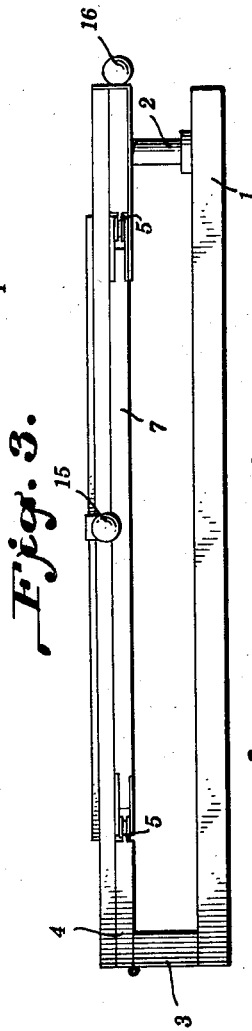
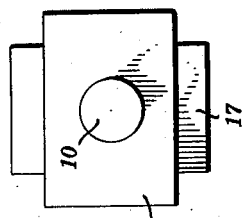
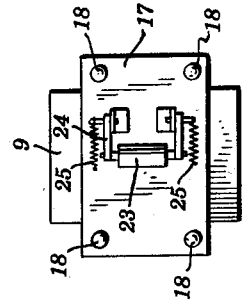
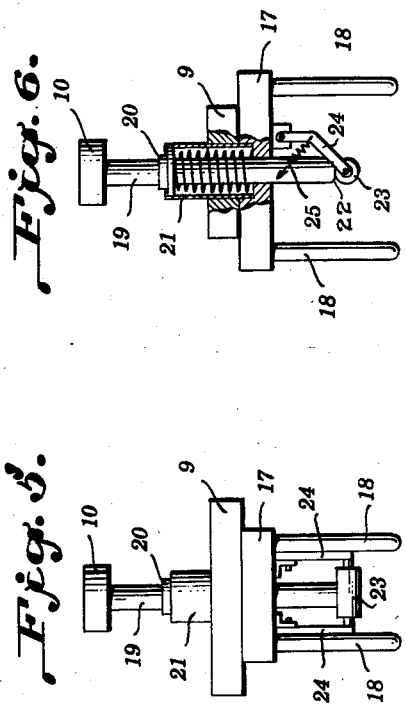
INVENTOR.
LEONARD G. TOWNSEND
BY
ATTORNEY Patented June 23, 1942

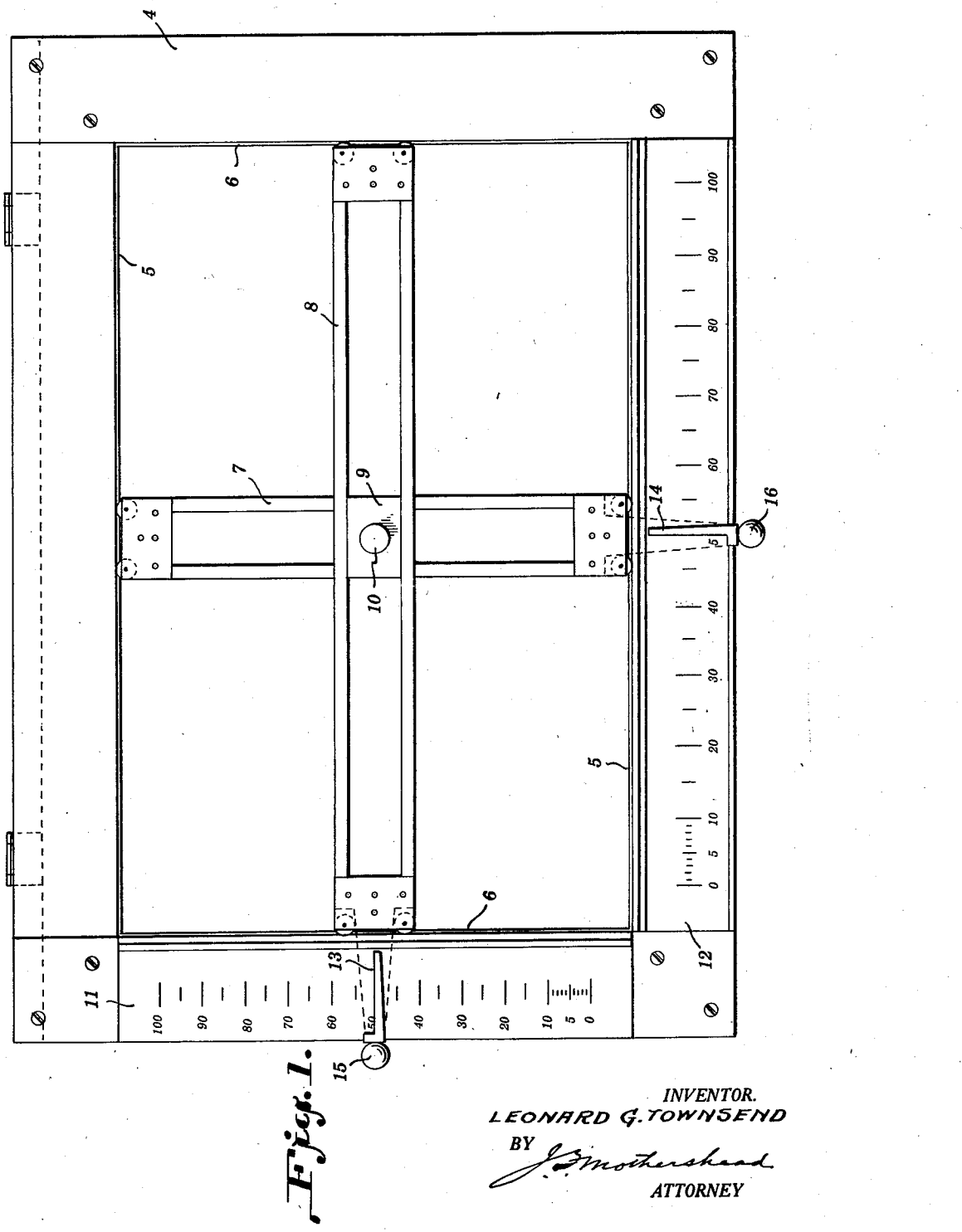

2,287,072

UNITED STATES PATENT OFFICE 2,287,072

APPARATUS FOR PLOTTING SPOT GRAPHS

Leonard G. Townsend, Washington, D. C.

Application July 11, 1940, Serial No. 344,932

4 Claims. (Cl. 33—189)

(Granted under the act of March 3, 1883, as amended April 30, 1928; 370 O. G. 757)

The invention described herein, if patented, may be manufactured and used by or for the Government for governmental purposes without the payment to me of any royalty thereon.

This invention relates to the art of plotting graphs, and more particularly to a method of and device for locating points on a surface in accordance with a system of two-dimensional coordinates. Heretofore in the plotting of graphs on a surface one common practice has been to locate the points thereon with respect to the lines on ruled coordinate paper or graph paper in accordance with the system of cartesian coordinates. The plotting of graphs on coordinate paper or graph paper is quite tedious and tiring. Very often errors occur in plotting on graph paper. When the divisions of regular chart paper or graph paper are too small to be readily followed by the draftsman's eye wrong amounts are often plotted, and this results in the retrogression line being erroneously indicated.

This method of plotting requires accurately ruled paper with intersecting lines very closely spaced so that plotted points are often not clearly visible. When graphs of this nature are photographed the unwanted divisions of the chart paper come up on the copy and detract from the readability of the chart unless expensive filters or special chart paper is used. These ruled coordinate papers are usually quite expensive and in order to always have the desired coordinates several sizes and variously graduated paper must be stocked.

Devices and methods have also been devised whereby graphs may be plotted on plain, unruled surfaces. Devices and methods of this nature are disclosed in the following United States patents: Owens, 1,340,623, May 18, 1920; Trueblood, 1,440,510, January 2, 1923; and Webster, 1,442,710, January 16, 1923.

The present invention relates to an improved device and method for the plotting of graphs belonging to the general type set forth in the patents referred to hereinbefore.

Briefly stated the device of the present invention includes a rectangular frame adapted to overlie a plotting surface, together with two mutually perpendicular slotted members supported adjacent to their ends upon said rectangular frame in such a manner as to be independently movable across said frame, each slotted member being movable only in a direction perpendicular to its longitudinal axis and parallel to the longitudinal axis of the other slotted member, together with a marking device arranged to partially lie within the slot in each of said slotted members so as to always occupy a position corresponding to the intersection of the slots in said slotted members. Each of the slotted members is provided with a pointer associated with respective ordinate and abscissa scales carried on said rectangular frame.

The principal object of this invention is to provide a method of and apparatus for eliminating the necessity of providing skilled draftsmen for the plotting of spot graphs.

More specifically, it is an object of this invention to provide a device enabling one to set a pair of members along coordinate scales to effect the setting of a marking member, which marking member when actuated after being thus set makes an appropriate symbol perforation or puncture on a sheet at a position corresponding to the coordinate setting of said members.

Another object of this invention is to provide a spot graph plotting device in which two factors may be plotted with respect to a system of rectangular coordinates, either arithmetically, logarithmically or semi-logarithmically depending upon the scales selected and mounted on the frame member.

Another object of this invention is to provide a plotting device in which a point marking device that is key-actuated to make an impression on a chart, is set automatically to position when only two settings are effected.

Another object of this invention is to provide a plotting device in which the plotted points are accessible to view at all times during the plotting operation.

Other objects and advantages of this invention will appear from the more detailed description of the invention following hereinafter, when taken in conjunction with the accompanying drawings, wherein—

Fig. 1 is a top plan view of a preferred embodiment of the invention showing the movable intersecting slotted members, the marking assembly moved by said slotted members, and a selected set of coordinate scales associated with pointers carried by said slotted members.

Fig. 2 is a front elevation of the invention with the marking assembly removed, showing the means for supporting the graph plotting mechanism proper above the graph sheet carrying table or bed.

Fig. 3 is a side elevation of the invention with the marking assembly removed, showing the top hinged connection between the plotting mechanism proper and its supporting means.

Fig. 4 is a plan view of the marking member assembly as it appears when removed from its position at the intersection of the slotted members shown in Fig. 1.

Fig. 5 is a front elevation of the marking member assembly of Fig. 4 showing the glide supports therefor and the inking arrangement for inking an impression member or character carried on the lower end of the marking key.

Fig. 6 is a side elevation partly in section of the marking member assembly shown in Figs. 4 and 5.

Fig. 7 is a view of the marking member assembly as seen from the bottom.

Referring to Figs. 1, 2 and 3, the numeral 1 denotes the base of the device, which may be made of wood or any suitable drawing board material, as its top surface forms the platen or table for carrying a sheet on which a graph is to be plotted or analyzed.

The base is provided with pins 2 and a supporting block 3 fixed thereto for supporting a rectangular frame member 4. The rectangular frame is hingedly attached to the supporting block 3 as shown in Fig. 3 so that it may be raised at the front from pins 2 to make the top surface of the support 1 readily accessible. The rectangular frame 4 may be made as a single piece or of several pieces joined together as shown. The rectangular frame 4 is provided at its inner periphery with two sets of mutually perpendicular rails or tracks 5 and 6 at different levels. A slotted member or carriage 7 is mounted for movement along the rails or tracks 5. A slotted member or carriage 8 is mounted for movement along the rails 6. The members 7 and 8 are shown mounted on their respective tracks with double flanged wheels or rollers. However, it is to be understood that these members can be mounted for sliding motion or in any other manner permitting movement thereof along one dimension only.

The marking member assembly 9 with the marking key 10 is mounted at the intersection of the slots in members 7 and 8, and this assembly moves with the members 7 and 8 so as to always occupy a position corresponding to the intersection of these members. The frame 4 is provided with slots adapted to receive an ordinate scale 11 and an abscissa scale 12. The carriage or slotted member 8 is provided with a pointer 13 attached thereto and extending outwardly underneath the frame 4 and back over the ordinate scale 13. The carriage or slotted member 7 is provided with a pointer 14 attached thereto and extending outwardly underneath the frame 4 and back over the abscissa scale 12.

An adjusting handle 15 is attached to the pointer 13 for moving that pointer and the carriage or slotted member 8 connected therewith. An adjusting handle 16 is attached to the pointer 14 for moving that pointer and the carriage or slotted member 7 attached thereto.

The marking member assembly shown at the intersection of members 7 and 8 in Fig. 1 may be more readily understood by reference to Figs. 4, 5, 6 and 7. This assembly is composed of a rectangular portion 9 having a width equal to the width of the slot in the member 8 (see Fig. 1). Below the portion 9 and integral therewith is a rectangular portion 17 disposed with its longitudinal axis perpendicular to the longitudinal axis of the portion 9. The portion 17 has a width equal to the width of the slot in the member 7 (see Fig. 1).

Glider legs 18 depend from the underside of member 17 and serve to support the marking assembly without placing an undue strain on the slotted member 7. The marking key 10 is made integral with a pin 19 extending therefrom through a vertical bearing opening provided in the portions 9 and 17 of the marking assembly. The pin 19 is provided with a flange 20 between which flange and the member 9 a coil spring 21 is positioned for maintaining the marking key and pin in its upward or non-marking position. The lower end of the pin 19 is provided with a type face or impression member 22 adapted to print upon or puncture the chart or paper against which it is forced upon depression of the marking key 10. An inking roller 23 is rotatably mounted on arms 24 pivoted to brackets fastened to the member 17. A spring 25 is connected between the member 17 and a point on the arm 24 in such manner as to force the roller 23 carried thereby into inking engagement with the impression member 22 carried on the end of pin 19.

As will be obvious, when the marking key 10 is depressed against spring 21 the pin 19 connected to the marking key descends and the inking roller 23 mounted on arms 24 is moved aside and the impression member 22 is brought into marking engagement with the chart or graph therebeneath. When the key is released the parts return to the position shown in Figs. 5 and 6.

In use the device is manipulated as follows:

The hinged assembly including the rectangular frame 4 carrying the members 7, 8, 9 and 10, etc., is raised and a sheet of paper of the desired size is inserted and fastened to the bed 1 of the device by any suitable means known to the art, such as thumb tacks, pegs or adhesive tape. Then the frame 4 and the parts carried thereby are lowered. Ordinate and abscissa scales 11 and 12 having a range corresponding to the data to be plotted are then inserted in their respective guides and properly indexed. Then by means of the handles 15 and 16 the marking assembly is moved to correspond to the position of the first point to be plotted. Thus, pointer 13 is moved along scale 11 to correspond to the first ordinate, and pointer 14 is moved along the scale 12 to correspond to the first abscissa and then the marking key 10 is depressed causing the impression member 22 to be brought into engagement with the paper on the support to mark the first plotted point thereon. Other points are plotted in like manner until the whole series have been plotted. In the event that there are several curves to be plotted on one sheet it is desirable for the sake of avoiding ambiguity to use different impression members for marking the points of the different series. Thus the key 10 and the impression member 22 connected therewith may be removed and replaced with a key carrying a different impression member. These impression members may correspond to different type faces or any type of design that may be wanted. A square, a circle, a triangle, etc., each with a dot or perforating member at its center are characters that are readily distinguishable. Instead of using impression members with different characters thereon a single character may be used and the color of the ink applied to the roller may be changed for different curves or graphs where several curves are to be plotted.

It will be understood that changes in size, form and construction of the various parts of this invention may be made without departing from the spirit of the invention, the scope of which is set forth in the appended claims.

I claim—

1. A plotting device for plotting points in a system of cartesian coordinates comprising a support providing a surface for supporting a sheet on which points are to be plotted, a frame member overlying said surface, said frame member being provided with at least two pairs of tracks arranged at an angle to each other, a pair of longitudinally slotted members mounted on respective pairs of said tracks for independent movement over said supporting surface at right angles to the respective slots therein, a marking means located partially within the slots of each of said slotted members, whereby said marking means is moved responsive to movement of either of said slotted members and a graduated scale aligned with the path of movement of each of said slotted members.

2. In a device for plotting graphs, a member having a supporting surface, a pair of slotted members angularly disposed with respect to each other and means for confining said slotted members to paths of movement over said supporting surface angularly disposed with respect to their respective longitudinal axes, coordinate scales associated with said members, and means carried at the intersection of said slotted members whereby said slotted members may each be moved to a desired coordinate setting to effect the setting of said means at a position above said surface corresponding in position to the coordinate setting of both of said slotted members.

3. A device in accordance with claim 2 in which said last mentioned means includes a depressible member for marking said surface when depressed.

4. A device for plotting and analyzing graphs comprising a support having a surface for holding a sheet, a rectangular frame member mounted on said support overlying said surface, said frame member being hingedly attached to said support whereby it may be moved to render said surface capable of free access, tracks on said rectangular member arranged at right angles to each other defining a plane parallel to the plane of said surface when said frame overlies said surface, movable elongated members mounted in intersecting relation on respective ones of said tracks for independent movement on said frame at right angles with respect to one another and to their own longitudinal axes, a marking means carried at the point of intersection of said elongated members whereby said marking member is moved responsive to movement of either of said elongated members and a pair of graduated scales mounted on said frames aligned with the paths of movement of respective ones of said elongated members whereby said members may be set coordinately to bring said marking member to any desired point above said surface.

LEONARD G. TOWNSEND.